(12) United States Patent
Lee et al.

(10) Patent No.: US 10,397,585 B2
(45) Date of Patent: Aug. 27, 2019

(54) PROCESSING HIGH DYNAMIC RANGE AND WIDE COLOR GAMUT VIDEO DATA FOR VIDEO CODING

(71) Applicant: QUALCOMM Incorporated, San Diego, CA (US)

(72) Inventors: Sungwon Lee, San Diego, CA (US); Joel Sole Rojals, San Diego, CA (US); Adarsh Krishnan Ramasubramonian, San Diego, CA (US); Dmytro Rusanovskyy, San Diego, CA (US); Done Bugdayci Sansli, Tampere (FI); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 15/176,014

(22) Filed: Jun. 7, 2016

(65) Prior Publication Data

US 2016/0360213 A1 Dec. 8, 2016

Related U.S. Application Data

(60) Provisional application No. 62/172,724, filed on Jun. 8, 2015.

(51) Int. Cl.
*H04N 19/186* (2014.01)
*H04N 19/124* (2014.01)
(Continued)

(52) U.S. Cl.
CPC .......... *H04N 19/186* (2014.11); *G06T 5/00* (2013.01); *G06T 5/009* (2013.01); *H04N 1/60* (2013.01);
(Continued)

(58) Field of Classification Search
CPC .. H04N 19/186; H04N 19/124; H04N 19/132; H04N 19/85; G06T 5/009; G06T 2207/20208
(Continued)

(56) References Cited

U.S. PATENT DOCUMENTS

| 4,812,903 A | * | 3/1989 | Wagensonner | ...... H04N 1/6027 |
| | | | | 348/645 |
| 5,686,939 A | * | 11/1997 | Millward | ............... G09G 3/346 |
| | | | | 345/108 |

(Continued)

FOREIGN PATENT DOCUMENTS

| JP | S62220087 A | 9/1987 |
| WO | 2014030343 A1 | 2/2014 |
| WO | 2014130343 A2 | 8/2014 |

OTHER PUBLICATIONS

Chiang, et al.,"Saturation Adjustment Method based on Human Vision with YCbCr Color Model Characteristics and Luminance Changes," Intelligent Signal Processing and Communications Systems (ISPACS), 2012 International Symposium on, IEEE, Nov. 4, 2012, pp. 136-141.

(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

In general, techniques are described for processing high dynamic range (HDR) and wide color gamut (WCG) video data for video coding. A device comprising a memory and a processor may perform the techniques. The memory may store compacted fractional chromaticity coordinate (FCC) formatted video data. The processor may inverse compact the compacted FCC formatted video data using one or more inverse adaptive transfer functions (TFs) to obtain decom- (Continued)

pacted FCC formatted video data. The processor may next inverse adjust a chromaticity component of the decompacted FCC formatted video data based on a corresponding luminance component of the decompacted FCC formatted video data to obtain inverse adjusted FCC formatted video data. The processor may convert the chromaticity component of the inverse adjusted FCC formatted video data from the FCC format to a color representation format to obtain High Dynamic Range (HDR) and Wide Color Gamut (WCG) video data.

29 Claims, 8 Drawing Sheets

(51) Int. Cl.
H04N 19/132 (2014.01)
H04N 19/85 (2014.01)
G06T 5/00 (2006.01)
H04N 1/60 (2006.01)

(52) U.S. Cl.
CPC ......... H04N 19/124 (2014.11); H04N 19/132 (2014.11); H04N 19/85 (2014.11); G06T 2207/20208 (2013.01)

(58) Field of Classification Search
USPC .................................................. 375/240.03
See application file for complete search history.

(56) References Cited

U.S. PATENT DOCUMENTS

| | | | | |
|---|---|---|---|---|
| 8,498,332 | B2* | 7/2013 | Jiang | H04N 9/646 375/240.01 |
| 8,718,451 | B1* | 5/2014 | Linzer | H04N 5/77 386/224 |
| 2016/0005349 | A1 | 1/2016 | Atkins et al. | |
| 2016/0205367 | A1 | 7/2016 | Wallace et al. | |
| 2016/0227227 | A1 | 8/2016 | Deshpande | |
| 2016/0316207 | A1* | 10/2016 | Minoo | H04N 19/136 |
| 2016/0360214 | A1 | 12/2016 | Sole Rojals et al. | |
| 2017/0026646 | A1 | 1/2017 | Minoo et al. | |

OTHER PUBLICATIONS

International Search Report and Written Opinion from International Application No. PCT/US2016/036488, dated Sep. 14, 2016, 12 pp.
Lee, et al., "CE2-related: Report of LumaATF with LCS," MPEG Meeting; Oct. 19-23, 2015; Geneva; (Motion Picture Expert Group or ISO/IEC JTC1/SC29/WG11), No. m37245, Oct. 16, 2015, 5 pp.
Luthra, et al., "Call for Evidence (CfE) for HDR and WCG Video Coding," MPEG Meeting; Feb. 6-20, 2015; Geneva; (Motion Picture Expert Group or ISO/IEC JTC1/SC29/WG11),, No. m36131, Feb. 20, 2015, 47 pp.
Response to International Search Report and Written Opinion dated Sep. 14, 2016, from International Application No. PCT/US2016/036488, filed on Dec. 14, 2016, 3 pp.
"Digital Cinema System Specification," Digital Cinema Initiatives, LLC, Version 1.2, Mar. 7, 2008, 156 pp.
"D-Cinema Distribution Master—Image Characteristics," SMPTE Standard, SMPTE 428-1-2006, Sep. 29, 2006, 8 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_D2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
"CIE 15: technical Report: Colorimetry," 3rd edition, 2004, 82 pp (ISBN 3 901 906 33 9).
"Candidate Test Model for HEVC extension for HDR and WCG video coding," ISO/IEC JTC1/SC29/WG11 MPEG2015/m37xxx; Oct. 2015, Geneva, Switzerland, 10 pp.
Miller, et al., "Perceptual Signal Coding for More Efficient Usage of Bit Codes," The 2012 Annual Technical Conference & Exhibition, Oct. 23-25, 2012, 39 slides.
Miller, "A Perceptual EOTF for Extended Dynamic Range Imagery," Dobly Laboratories, Inc., www.smpte.org, May 6, 2014; 34 slides.
Ford, et al., "Colour Space Coversions," Aug. 11, 1998, 31 pp.
Kirk, "Standard Colour Spaces," FL-TL-TN-0417-StdColourSpaces, FilmLight, Version 4.0, Nov. 30, 2010, 47 pp.
Wiegand, "Acquisition, Representation, Display, and Perception of Images and Video," Digital Image Communication, accessed on May 27, 2016, 47 slides.
Luthra et al., "Call for Evidence (CfE) for HDR and WCG Video Coding," ISO/IEC JTC1/SC29/WG11 MPEG2014/N15083, Feb. 2015, 46 pp.

(56) References Cited

OTHER PUBLICATIONS

"High Dynamic Range Electro-Optical Transfer Function of Mastering Reference Displays," SMPTE ST 2084:2014; SMPTE Standard, Aug. 16, 2014, 14 pp.
Fjelsted, et al., "Understanding HDR," SpecraCal, Inc., May 2015, 4 pp.
"Parameter values for the HDTV standards for production and international programme exchange," Recommendation ITU-R BT.709-6, International Telecommunication Union, Jun. 2015, 19 pp.
"Parameter values for ultra-high definition television systems for production and international programme exchange," Recommendation ITU-R BT.2020-2, International Telecommunication Union, Oct. 2015, 8 pp.
"High Dynamic Range Electro-Optical Transfer Function of Mastering Reference Displays," SMPTE Standard; SMPTE ST 2084:2014; Aug. 16, 2014; 14 pp.
Wang, et al. "High Efficiency Video Coding (HEVC) Defect Report 3," JCT-VC Meeting: Jan. 9-17, 2014; (Joint Collaborative Team on Video Coding of ISO/IEC JTC1/SC29/WG11 and ITU-T SG.16); No. JCTVC-P1003_v1 relative to L1003v34; Feb. 8, 2014; 313 pp.
Sole, et al., "HDR CE5 test 3: Constant Luminance results," JCT-VC Meeting: Feb. 19-26, 2016; (Joint Collaborative Team on Video Coding of ISO/IEC JTC1/SC29/WG11 and ITU-T SG.16); No. JCTVC-W0099; Feb. 21, 2016; 5 pp.
Wang, et al. "High Efficiency Video Coding (HEVC) Defect Report 3," JCT-VC Meeting: Jan. 9-17, 2014; (Joint Collaborative Team on Video Coding of ISO/IEC JTC1/SC29/WG11 and ITU-T SG.16); No. JCTVC-P1003_v1 relative to O1003v2; Feb. 8, 2014; 313 pp.
Rusanovskyy, et al., "Description of Core Experiment 1 (CE1): Optimization without HEVC specification change," ISO/IEC JTC1/SC29/WG11, N15455, Video Subgroup, Jun. 2015, 4 pp.
"Parameter values for the HDTV standards for production and international programme exchange," Recommendation ITU-R BT.709-5, International Telecommunication Union, Apr. 2002, 32 pp.
Fogg, et al., "Indication of SMPTE 2084, 2085 and Carnage of 2086 Metadata in HEVC", JCT-VC Meeting; Jan. 9-17, 2014; San Jose; (Joint Collaborative Team on Video Coding of ISO/IEC JTC1/SC29/WG11 and ITU-T SG.16); URL: http:/WFTP3.ITU.INT/AV-ARCH/JCTVC-SITE/, No. JCTVC-P0084-v2, Jan. 14, 2014; XP030115562, 5 pp.
Stessen, et al., "Chromaticity Based Color Signals for Wide Color Gamut and High Dynamic Range", ISO/IEC JTC1/SC29/WG11 Coding of Moving Pictures and Audio, MPEG2014/M35065, Oct. 2014, XP055273234, 18 pp.
Sullivan, et al., "Overview of the High Efficiency Video Coding (HEVC) Standard", IEEE Transactions on Circuits and Systems for Video Technology, Sep. 28, 2012, XP55045358, ISSN: 1051-8215, DOI:10.1109/TCSVT.2012.2221191, 19 pp.
Working Party 6C: "Revision 1 to Document 6/18-E—Draft New Recommendation ITU-R BT [Image-UHDTV]: Parameter Values for UHDTV Systems for Production and International Programme Exchange", Document 6C/TEMP/26—Radio Communication Study Groups, ITU, May 2, 2012, XP030053584, 6 pp.
International Preliminary Report on Patentability—PCT/US2016/036488, The International Bureau of WIPO—Geneva, Switzerland, dated Aug. 28, 2017.
Second Written Opinion from International Application No. PCT/US2016/036488, dated May 18, 2017, 6 pp.
ITU-R Recommendation BT2020-1, "Parameter Values for Ultra-High Definition Television Systems for Production and International Programme Exchange", Jun. 2014, 8 pages.

\* cited by examiner

US 10,397,585 B2

PROCESSING HIGH DYNAMIC RANGE AND WIDE COLOR GAMUT VIDEO DATA FOR VIDEO CODING

This application claims the benefit of U.S. Provisional Application No. 62/172,724, entitled "COLOR NOISE REDUCTION AND ADAPTIVE TRANSFER FUNCTIONS FOR FRACTIONAL CHROMATICITY COORDINATES FOR HIGH DYNAMIC RANGE AND WIDE COLOR GAMUT VIDEO DATA," filed 8 Jun. 2015, the entire contents of which are incorporated herein by reference.

TECHNICAL FIELD

This disclosure relates to video coding and, more specifically, to video coding of high dynamic range (HDR) and wide color gamut (WCG) video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure is related to encoding and decoding of video signals with High Dynamic Range (HDR) and Wide Color Gamut (WCG) representations. More specifically, the techniques of this disclosure include signaling and operations applied to video data in certain color spaces to enable more efficient compression of HDR and WCG video data. The proposed techniques may improve compression efficiency of hybrid-based video coding systems (e.g., HEVC-based video coders) utilized for coding HDR and WCG video data.

In one aspect, a method of processing video data comprises inverse compacting compacted fractional chromaticity coordinate (FCC) formatted video data using one or more inverse adaptive transfer functions (TFs) to obtain decompacted FCC formatted video data, inverse adjusting a chromaticity component of the decompacted FCC formatted video data based on a corresponding luminance component of the decompacted FCC formatted video data to obtain inverse adjusted FCC formatted video data, and converting the chromaticity component of the inverse adjusted FCC formatted video data from the FCC format to a color representation format to obtain High Dynamic Range (HDR) and Wide Color Gamut (WCG) video data.

In another aspect, a method of processing video data comprises converting a chromaticity component of High Dynamic Range (HDR) and Wide Color Gamut (WCG) video data between a color representation format and fractional chromaticity coordinate (FCC) format, adjusting a chromaticity component of the FCC formatted video data based on a corresponding luminance component of the FCC formatted video data to obtain adjusted FCC formatted video data, and compacting the FCC formatted video data using one or more adaptive transfer functions (TFs) to obtain compacted FCC formatted video data.

In another aspect, a device configured to process video data comprises a memory configured to store compacted fractional chromaticity coordinate (FCC) formatted video data. The device also comprises a processor configured to inverse compact the compacted FCC formatted video data using one or more inverse adaptive transfer functions (TFs) to obtain decompacted FCC formatted video data, inverse adjust a chromaticity component of the decompacted FCC formatted video data based on a corresponding luminance component of the decompacted FCC formatted video data to obtain inverse adjusted FCC formatted video data, and convert the chromaticity component of the inverse adjusted FCC formatted video data from the FCC format to a color representation format to obtain High Dynamic Range (HDR) and Wide Color Gamut (WCG) video data.

In another aspect, a device configured to process video data comprises a memory configured to store High Dynamic Range (HDR) and Wide Color Gamut (WCG) video data. The device also comprises a processor configured to convert a chromaticity component of HDR and WCG video data between a color representation format and fractional chromaticity coordinate (FCC) format, adjust a chromaticity component of the FCC formatted video data based on a corresponding luminance component of the FCC formatted video data to obtain adjusted FCC formatted video data, and compact the FCC formatted video data using one or more adaptive transfer functions (TFs) to obtain compacted FCC formatted video data.

The details of one or more aspects of the techniques are set forth in the accompanying drawings and the description below. Other features, objects, and advantages of these techniques will be apparent from the description and drawings, and from the claims.

DETAILED DESCRIPTION

This disclosure is related to encoding and decoding of video signals with High Dynamic Range (HDR) and Wide Color Gamut (WCG) representations. More specifically, the techniques of this disclosure include signaling and operations applied to video data in certain color spaces to enable more efficient compression of HDR and WCG video data. The proposed techniques may improve compression efficiency of hybrid-based video coding systems (e.g., HEVC-based video coders) utilized for coding HDR and WCG video data.

Video coding standards, including hybrid-based video coding standards, include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely HEVC, has been finalized by the Joint Collaboration Team on Video Coding (JCT-VC) of ITU-T Video Coding Experts Group (VCEG) and ISO/IEC Motion Picture Experts Group (MPEG). The finalized HEVC standard, hereinafter referred to as "HEVC Version 1," is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013, with another version published in October 2014.

Figure 1:
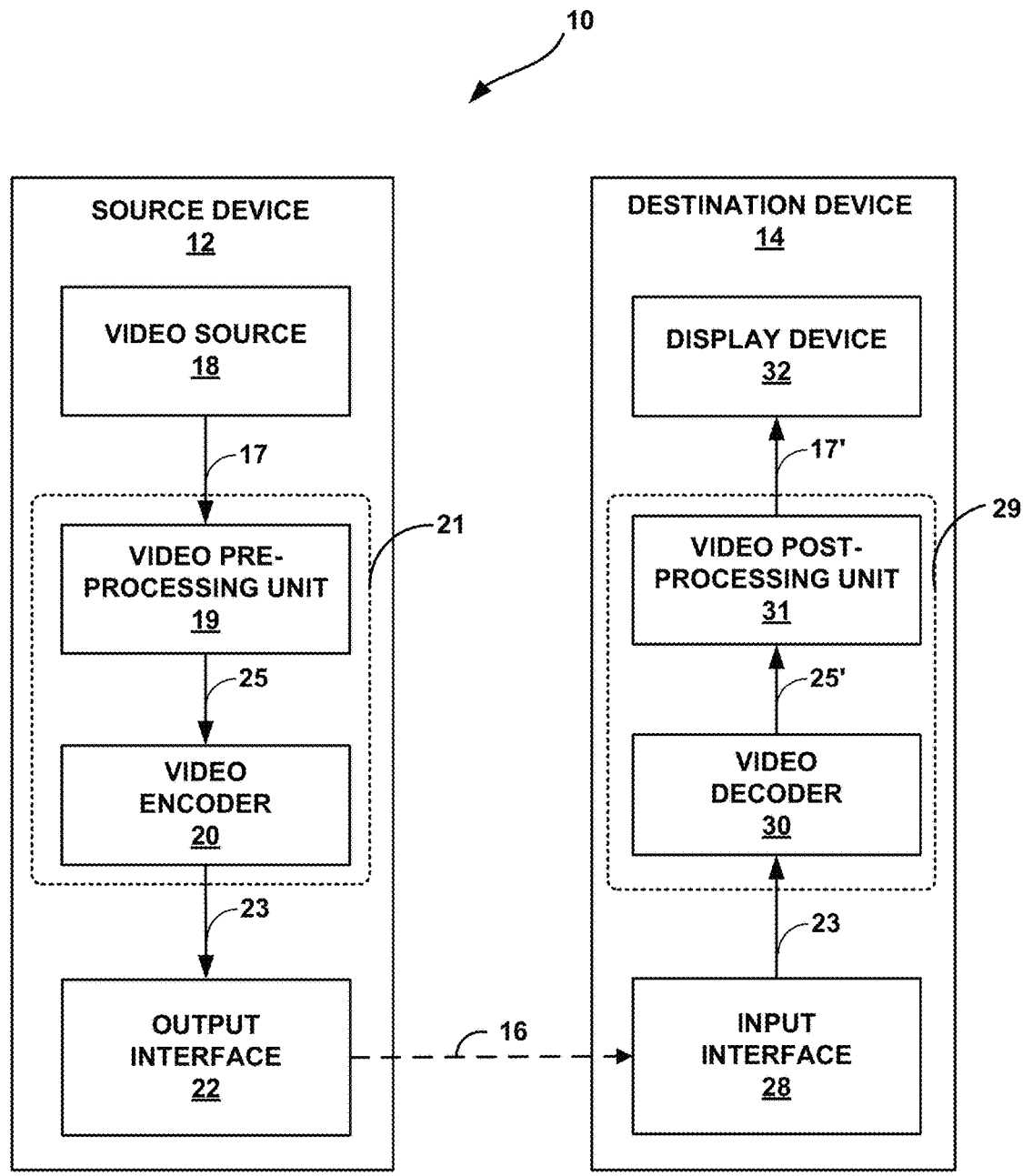
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by an input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, a video encoding unit 21 with a video pre-processing unit 19 and a video encoder 20, and output interface 22. Destination device 14 includes input interface 28, a video decoding unit 29 with a video decoder 30 and a video post-processing unit 31, and display device 32. In accordance with this disclosure, video encoder 20 of source device 12 may be configured to apply the techniques for processing video data in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoding unit 21 including video pre-processing unit 19 and video encoder 20, and video decoding unit 29 including video decoder 30 and video post-processing unit 31 may be implemented as any of a variety of suitable encoder circuitry, including fixed function and/or programmable processing circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video pre-processing unit 19 and video post-processing unit 31 may operate according to the techniques described in this disclosure. For example, video pre-processing unit 19 may operate to convert HDR/WCG video data from a high precision and almost mathematically lossless representation to a more compact or robust color space that is more suitable for video compression and encoding, e.g., from RGB to YUV or YCbCr. This color conversion may occur prior to video compression and encoding performed by video encoder 20. In other examples, video encoder 20 itself may operate to convert the HDR/WCG video data from a high precision representation to a more compact or robust color space for video compression and encoding.

Conversely, video post-processing unit 31 may operate to convert decoded video data from the more compact or robust color space back to the high precision representation of the original HDR/WCG video data, e.g., from YUV or YCbCr to RGB. This inverse color conversion process may occur after video decompression and decoding performed by video decoder 30. In other examples, video decoder 30 itself may operate to convert the decoded video data from the more compact or robust color space back to the high precision representation of the original HDR/WCG video data.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the HEVC standard.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location, and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RB SP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with High Dynamic Range (HDR) and Wide Color Gamut (WCG). Parameters of the utilized dynamic range and color gamut are two independent attributes of video content. The specification of the parameters of the utilized dynamic range and color gamut for purposes of digital television and multimedia services are defined by several international standards. For example ITU-R Rec. 709 defines parameters for HDTV (high definition television), such as Standard Dynamic Range (SDR) and standard color gamut, and ITU-R Rec. 2020 specifies UHDTV (ultra-high definition television) parameters for as HDR and WCG. There are also other standards developing organization (SDO) documents that specify dynamic range and color gamut attributes in other systems. For example, P3 color gamut is defined in SMPTE-231-2 (Society of Motion Picture and Television Engineers) and some parameters of HDR are defined in STMPTE-2084, published as SMPTE ST 2084:2014, "High Dynamic Range Electro-Optical Transfer Function of Mastering Reference Displays," 2014. A brief description of dynamic range and color gamut for video data is provided below.

Dynamic range may be defined as the ratio between the minimum and maximum brightness of the video signal. Dynamic range may also be measured in terms of 'f-stop,' where one f-stop corresponds to a doubling of the signal dynamic range. MPEG defines HDR content as content that features brightness variation with more than 16 f-stops. In some standards, dynamic range levels between 10 and 16 f-stops may be referred to as an intermediate dynamic range, while in other standards, dynamic range levels between 10 and 16 f-stops may be considered HDR. Although referred to as HDR, the human visual system (HVS) is capable for perceiving much larger dynamic range. The HVS, however, includes an adaptation mechanism to narrow a so-called simultaneous range. As such, HDR refers to a higher dynamic range than standard dynamic range (SDR).

Current video application and services are regulated by ITU-R Rec. 709 and provide SDR, typically supporting a range of brightness (or luminance) of around 0.1 to 100 candelas (cd) per m2 (often referred to as "nits"), leading to less than 10 f-stops (given that 0.1-0.2 is the first f-stop, 0.2-0.4 is the second f-stop, . . . , 25.6-51.2 is the ninth f-stop and 51.2-102.4 is the tenth f-stop). Next generation video services are expected to provide HDR with dynamic range up to 16 f-stops. For example, although a detailed specification is currently under development, some initial parameters of HDR have been specified in SMPTE-2084 and Rec. 2020.

Another aspect for a more realistic video experience besides HDR is the color dimension, which is conventionally defined by the color gamut. An SDR color gamut may be represented as a triangle based on the BT.709 color red, green and blue color primaries. The wider UHDTV color gamut may be represented as a triangle based on the BT.2020 color red, green and blue color primaries. Moving from BT.709 to BT.2020 color primaries aims to provide UHDTV services with about 70% more colors. D65 specifies the white color for given specifications.

As noted above, HDR/WCG video data is typically captured and stored at a very high precision per component (e.g., using a 32-bit floating point representation), with the 4:4:4 chroma format and a very wide color space (e.g., XYZ). For example, video source 18 may output HDR/WCG video data 17 with high precision, in the 4:4:4 chroma format, and using a very wide color space. HDR/WCG video data 17 may be high precision and nearly mathematically lossless. However, HDR/WGC video data 17 may include a number of redundancies, which may not be optimal for compression purposes.

In accordance with techniques described in this disclosure, video pre-processing unit 19 may convert HDR/WCG video data 17 from the high-precision, redundant representation to a relatively lower precision format. Formulation of the lower precision format may be premised upon HVS-based assumptions so as to reduce the redundancies of the relatively higher precision format while potentially maintaining an accurate representation of HDR/WCG video data 17. For example, video pre-processing unit 19 may convert a chromaticity component of the HDR/WCG video data between a color representation format and a fractional chromaticity coordinate (FCC) format.

Video pre-processing unit 19 may receive HDR/WCG video data 17 in a color representation format, such as a red, green, blue (RGB) color space or other additive color spaces. Video source 18 may, for example, include video- or image-capture sensors configured to use the color representation format when capturing HDR/WCG video data 17. Video pre-processing unit 19 may convert HDR/WCG video data 17 from the color representation format to one of any number of FCC formats, such as a Commission International on Illumination (or, in French, Commission Internationale de l'éclairage, which is commonly abbreviated as "CIE") Yu'v' format. The CIE-Yu'v' color space includes a luminance component, denoted as "Y," and two chromaticity components, denoted as "u'" and "v'." Although described herein with respect to the CIE-Yu'v' color space, video pre-processing unit 19 may convert the HDR/WCG video data to any FCC format, resulting in FCC formatted video data.

Video pre-processing unit 19 may, after converting HDR/WCG video data 17 to the FCC format, adjust one or more of the chromaticity components of the FCC formatted video data based on the corresponding luminance component, Y, of the FCC formatted video data. Video pre-processing unit 19 may adjust the chromaticity components of the FCC formatted video data when the corresponding luminance component of the FCC formatted video data indicates, as one example, low relative luminance (such as, for example, below some threshold luminance as discussed in more detail below). When the corresponding luminance component of the FCC formatted video data indicates high relative luminance, video pre-processing unit 19 may not adjust the chromaticity component of the FCC formatted video data.

Video pre-processing unit 19 may adjust the chromaticity components of corresponding low luminance pixels to reduce noise in the chromaticity components that may occur in low luminance settings. Video pre-processing unit 19 may set the chromaticity components of pixels having a relatively low luminance to indicate the color black or grey (which may effectively reduce the magnitude of the pixels to zero or below some low threshold) without impacting picture quality because the HVS is not sensitive to chromaticity in low luminance settings.

In this way, the techniques described in this disclosure may leverage HVS-based assumptions to facilitate reductions in bitrates given that reduced or zero values for chromaticity components may be better compressed during subsequent video encoding. That is, video encoding operates through comparisons of portions of pictures and successive compression of residual data resulting from the comparison of the portions of the pictures. Chromatic noise as a result of low luminance may result in increased amounts of residual data (given that the noise is mostly random and therefore cannot be temporally predicted). Reducing the amount of chromatic noise in the chromaticity components may thereby allow successive video encoding to better compress the pictures.

Video pre-processing unit 19 may also compact the adjusted chromaticity component of the FCC formatted video data using one or more transfer functions (TFs). The TF may represent a way by which to reduce the number of bits representative of relatively higher luminance pixels to allow for more bits to be used to represent lower luminance pixels. An example TF may include a perceptual quantizer (PQ) electro-optical transfer function (EOTF) set forth by the Society of Motion Picture & Television Engineers (SMPTE) in ST 2084:2014—SMPTE Standard—"High Dynamic Range Electro-Optical Transfer Function of Mastering Reference Displays," dated Aug. 29, 2014. The PQ EOTF may represent one example of a transfer function that has been developed to take advantage of limitations of the HVS in terms of quantizing bits used to represent chromaticity components. Although described with respect to PQ EOTF, the techniques may be performed using any form of TF.

After applying the transfer function, video pre-processing unit 19 may quantize the compacted FCC formatted video data. Video pre-processing unit 19 may, for example, identify any pixel values still defined in a floating point format and quantize the 32-bit floating point pixel values, to generate integer value pixel values having a reduced bit depth (e.g., from 32 down to between 12-10 bits). Video pre-processing unit 19 may also perform chromaticity subsampling with respect to the chromaticity components of the quantized FCC formatted video data. Video pre-processing unit 19 may perform the chromaticity subsampling to reduce the 4:4:4 sampling rate of the quantized FCC formatted video data to 4:2:0 or some other lower sampling rate for the chromaticity components of the quantized FCC formatted video data, thereby generating sub sampled FCC formatted video data 25. Video pre-processing unit 19 may output subsampled FCC formatted video data 25 to video encoder 20.

Video encoder 20 may perform the above discussed video encoding processing to form a bitstream 23 representative of a compressed version of the subsampled FCC formatted video data. The compressed version of the subsampled FCC video data may be of a smaller size (in terms of bits), due in part to the pre-processing performed by video pre-processing unit 19 discussed above, than a compressed version of the HDR/WCG video data 17 (having not undergone such pre-processing) as a result of the reduction of redundant information, color noise suppression (or, in other words, reduction), quantization, and chromaticity subsampling. The various pre-processing operations may not, despite lossy operations such as quantization and chromaticity subsampling, result in decreased quality of the video data given that the pre-processing operations are designed to take advantage of limitations of the HVS. Video encoder 20 may provide the bitstream 23 to output interface 22, which may output the bitstream 23 to input interface 28 of destination device 14 via computer-readable medium 16.

Input interface 28 of destination device 14, upon receiving bitstream 23, may output bitstream 23 to video decoder 30. Video decoder 30 may perform decoding operations that are reciprocal to the encoding operations performed by video encoder 20. For example, video encoder 20 may perform identify a block of a previously coded picture as a reference block for a block of a current picture and generate residual data as a difference between the reference block and the block of the current picture. Video encoder 20 may transform the residual data form the spatial domain to the frequency domain, eliminate low frequency coefficients through quantization, and perform statistical lossless encoding (which is often referred to as "entropy encoding") to generate compressed residual data. Video decoder 30 may perform reciprocal operations when performing entropy decoding, inverse quantization, and inverse transformations to recover a decoded version of the compressed residual data. Video decoder 30 may, after or while decoding bitstream 23, output decoded subsampled FCC formatted video data 25' to video post-processing unit 31. Decoded subsampled FCC formatted video data 25' may be similar, but not the same, as subsampled FCC formatted video data 25 given that lossy operations were performed during encoding of the subsampled FCC formatted video data 25.

Video post-processing unit 31 may perform operations reciprocal to those performed by video pre-processing unit 19 to post-process decoded subsampled FCC formatted video data 25'. For example, video post-processing unit 31 may performing chromaticity upsampling to increase the resolution of the chromaticity components of the subsampled FCC formatted video data 25' from 4:2:0 to 4:4:4, thereby generating quantized FCC formatted video data. Video post-processing unit 31 may next perform inverse quantization with respect to the quantized FCC formatted video data to obtain compacted FCC formatted video data.

Continuing to perform post-processing operations reciprocal to those performed by video pre-processing unit 19, video post-processing unit 31 may apply an inverse TF (such as, e.g., a perceptual dequantization electro-optical transfer function) to the compacted FCC formatted video data to obtain adjusted FCC formatted video data. Video post-processing unit 31 may apply an inverse chromaticity adjustment to the adjusted FCC formatted video data to obtain FCC formatted video data. Video post-processing unit 31 may convert the chromaticity component of the FCC formatted video data from the FCC format to the color representation format, thereby obtaining a decoded version of the HDR/WCG video data 17, which is denoted as HDR/WCG video data 17' (which again may be similar to, but not the same as, HDR/WCG video data 17 due to lossy operations performed during encoding). Video post-processing unit 31 may output HDR/WCG video data 17' to display device 32 of destination device 14, which may present HDR/WCG video data 17' for consumption by a viewer.

Figure 2:
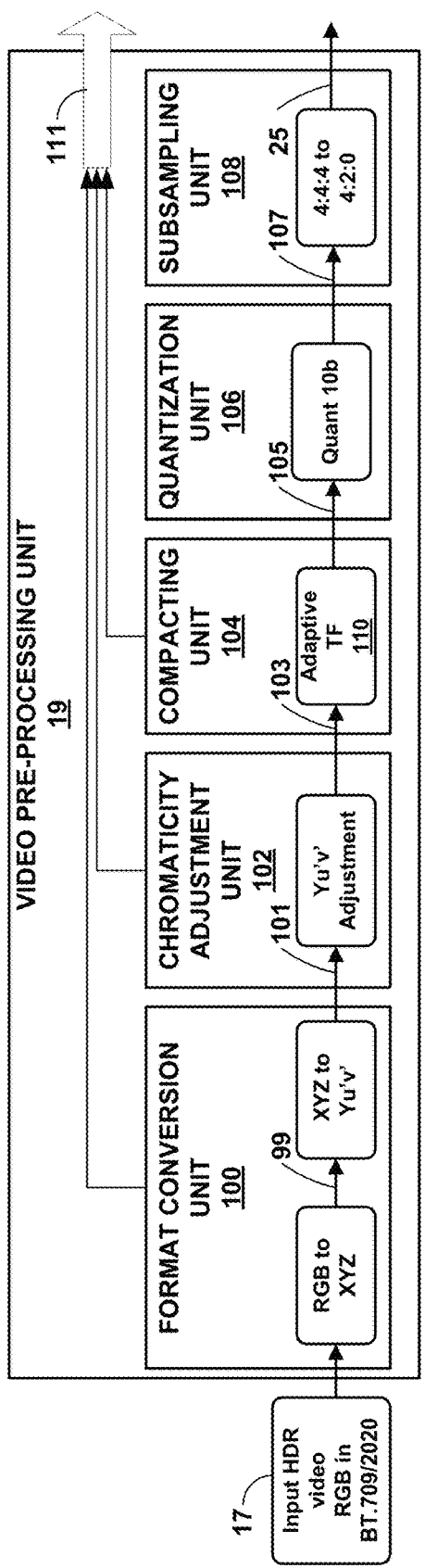
FIG. 2 is a block diagram illustrating the video pre-processing unit of FIG. 1 in more detail.

FIG. 2 is a block diagram illustrating video pre-processing unit 19 of FIG. 1 in more detail. In the example of FIG. 2, video pre-processing unit 19 includes a format conversion unit 100, a chromaticity adjustment unit 102, a compacting unit 104, a quantization unit 106, and a subsampling unit 108. Format conversion unit 100 represents a unit configured to convert a chromaticity component of HDR/WCG video data 17 from an RGB color space (or other color representation format) to an FCC format. Format conversion unit 100 may receive HDR/WCG video data 17 in the RGB color space having a color space defined in ITU-R BT.709 or ITU-R BT.2020. More information regarding color gamut parameters for these color spaces is provided in the Table 1 directly below.

TABLE 1

| Color space | Color gamut parameters RGB color space parameters | | | | | | | |
|---|---|---|---|---|---|---|---|---|
| | White point | | Primary colors | | | | | |
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

Format conversion unit 100 may first convert HDR/WCG video data 17 from the RGB color space to the CIE-XYZ color space. Converting from the RGB color space to the CIE-XYZ color space is a linear operation. Format conversion unit 100 may convert the HDR/WCG video data 17 from the RGB color space to the CIE-XYZ color space because RGB (or the other commonly used color space, YCbCr) does not have perceptual uniformity in chromaticity. Format conversion unit 100 may thereby generate XYZ formatted HDR/WCG video data 99.

Format conversion unit 100 may next convert XYZ formatted HDR/WCG video data 99 from the CIE-XYZ color space to an FCC color space, such as CIE-Yu'v' (which may also be referred to as an "FCC format" or "FCC color format"). Converting between CIE-XYZ color space to the CIE-Yu'v' color space may occur in accordance with the following equations (1)-(3):

$$Y = Y \quad (1)$$

$$u' = \frac{4X}{X + 15Y + 3Z} \quad (2)$$

$$v' = \frac{9Y}{X + 15Y + 3Z} \quad (3)$$

In some instances, format conversion unit 100 may fix a single set of FCC coefficients throughout all the types of input HDR signal, where format conversion unit 100 may use the Yu'v' color space for all types of HDR/WCG video data 17. In these instances, format conversion unit 100 may utilize equations (1)-(3) regardless of the type of HDR/WCG video data 17.

In other instances, format conversion unit 100 may switch between different types of FCC coefficients or, in other words, adaptively select a type of FCC coefficient based on the type of HDR/WCG video data 17. The general definition for FCC coefficients is provided by the following equations (4)-(6):

$$Y = Y \quad (4)$$

$$\alpha' = \frac{a_1 X}{a_2 X + a_3 Y + a_4 Z} \quad (5)$$

$$\beta' = \frac{b_1 Y}{b_2 X + b_3 Y + b_4 Z} \quad (6)$$

In equations (5) and (6), $\alpha'$ and $\beta'$ represent the chromaticity components of FCC formatted video data 101, and $a_1$-$a_4$ and $b_1$-$b_4$ represent variables that are adapted based on XYZ formatted HDR/WCG video data 99.

Format conversion unit 100 may, in some examples, may clip FCC formatted video data 101 to prevent FCC formatted video data 101 from exceeding a range. In other words, format conversion unit 100 may perform a "sanity check" to ensure FCC formatted video data 101 from exceeding a specified signal range. In any event, format conversion unit 100 may output the Yu'v' formatted HDR/WCG video data as FCC formatted video data 101 to chromaticity adjustment unit 102.

Chromaticity adjustment unit 102 may represent a unit configured to adjust a chromaticity component of the FCC formatted video data 101 based on a corresponding luminance component of FCC formatted video data 101. Chromaticity adjustment unit 102 may adjust the chromaticity components, e.g., u' and v' of FCC formatted video data 101, to suppress noise that occurs during low levels of luminance. As noted above, chromaticity adjustment unit 102 may set the chromaticity components to values that correspond to black or grey (where grey is defined as (u', v')=(0.19783, 0.46832)) when the corresponding luminance of the sample (i.e., a pixel in this example) is lower than a fixed threshold (which may be set to some value of luminance corresponding to shadows or below—e.g., between 0 and 1 nit).

Alternatively, chromaticity adjustment unit 102 may adaptively determine the threshold based on the luminance of some portion of the picture (e.g., a slice), the picture in its entirety, or a group of pictures (GOP) in which the current picture is included. For example, chromaticity adjustment unit 102 may analyze the luminance of all of the pixels in the picture and set the threshold such that the threshold applies to 5% of the darkest pixels. Chromaticity adjustment unit 102 may also adapt the 5% threshold based on whether or not the scene of the picture is a bright scene or a dark scene overall. In other words, when the darkest pixels are still relatively bright (e.g., above 1 nit), chromaticity adjustment unit 102 may lower the threshold such that the threshold applies to 2% of the darkest pixels. When the darkest pixels are relatively dark (e.g., below 1 nit), chromaticity adjustment unit 102 may increase the threshold such that the threshold applies to 5% or more of the darkest pixels.

In terms of adjusting the chromaticity components, chromaticity adjustment unit 102 may, as one example, set chromaticity components of a target pixel as an average of chromaticity components of neighboring pixels within a certain range when the corresponding luminance of the target pixel is lower than the fixed or adaptive threshold. In this example, rather than clip to grey, chromaticity adjustment unit 102 may apply an averaging filter to neighboring pixels that satisfy the following two conditions: 1) reside within a certain size of window with the center located at the target pixel; and 2) have luminance components that are lower than a fixed (or, in other words, pre-determined) or adaptive threshold.

Moreover, in some examples, chromaticity adjustment unit 102 may apply the same adjustment to each of the chromaticity components, e.g., u' and v'. In other examples, chromaticity adjustment unit 102 may perform a different adjustment with respect to each of the chromaticity components. That is, chromaticity adjustment unit 102 may apply a different noise reduction to each of the chromaticity components separately.

Chromaticity adjustment unit 102 may, through application of the adjustment to FCC formatted video data, obtain adjusted FCC formatted video data 103. Chromaticity adjustment unit 102 outputs the adjusted FCC formatted video data 103 to compacting unit 104.

Compacting unit 104 may represent a unit configured to compact the adjusted chromaticity component of the adjusted FCC formatted video data 103 using one or more adaptive transfer functions (TFs) 110. In some examples, compacting unit 104 may apply a single TF, e.g., the above referenced PQ EOTF specified in SMPTE-2084, to each chromaticity component independently. Mathematically, application of the same TF to each of the three components of adjusted FCC formatted video data 103 may be represented by the following equations (7)-(9):

$$Y' = TF(Y) \quad (7)$$

$$\alpha'' = TF(\alpha') \quad (8)$$

$$\beta'' = TF(\beta') \quad (9)$$

In equations (7)-(9), Y, $\alpha'$, and $\beta'$ represent the signals produced in equations (4)-(6) above, where TF( ) denotes the transfer function.

In this way, compacting unit 104 may apply the same one of TFs 110 to each of the Y, u', and v' components of adjusted FCC formatted video data 103. In other examples, compacting unit 104 may apply different TFs 110 to each of the three components separately. TFs 110 may include a log-like TF, where one example of the log-like TF may include the above referenced PQ EOTF specified in SMPTE-2084.

When applying log-like ones of TFs 110, compacting unit 104 may apply the log-like ones of TFs 110 to each component of the color space, e.g., independently for Y, u', and v'. In other instances, compacting unit 104 may apply log-like ones of TFs 110 only to the luminance component, Y, of adjusted FCC formatted video data 103. Compacting unit 104 may next apply adaptive linear ones of TFs 110 to the chromaticity components, u' and v', of adjusted FCC formatted video data 103 depending on a level of the corresponding luminance component, Y, of adjusted FCC formatted video data 103.

Adaptive linear ones of TFs 110 may be denoted mathematically by the following equations (10)-(12):

$$Y' = TF(Y) \quad (10)$$

$$\alpha'' = a_\alpha(Y)\alpha' + b_\alpha \quad (11)$$

$$\beta'' = a_\beta(Y)\beta' + b_\beta \quad (12)$$

In equations (10)-(12), TF denotes a non-linear (e.g., log-like) one of TFs 110 chosen for luminance components only, $a_\alpha$ and $a_\beta$ denote slopes for a linear one of TFs 110, and $b_\alpha$ and $b_\beta$ denote offsets that compacting unit 104 may determine based on FCC coefficients. In some instances, compacting unit 104 may set the slopes and offsets for $\alpha''$ and $\beta''$ components separately. In some instances, compacting unit 104 may select FCC coefficients that lead to identical (or nearly identical) offsets and/or the same slopes for both $\alpha''$ and $\beta''$ components.

Figure 4:
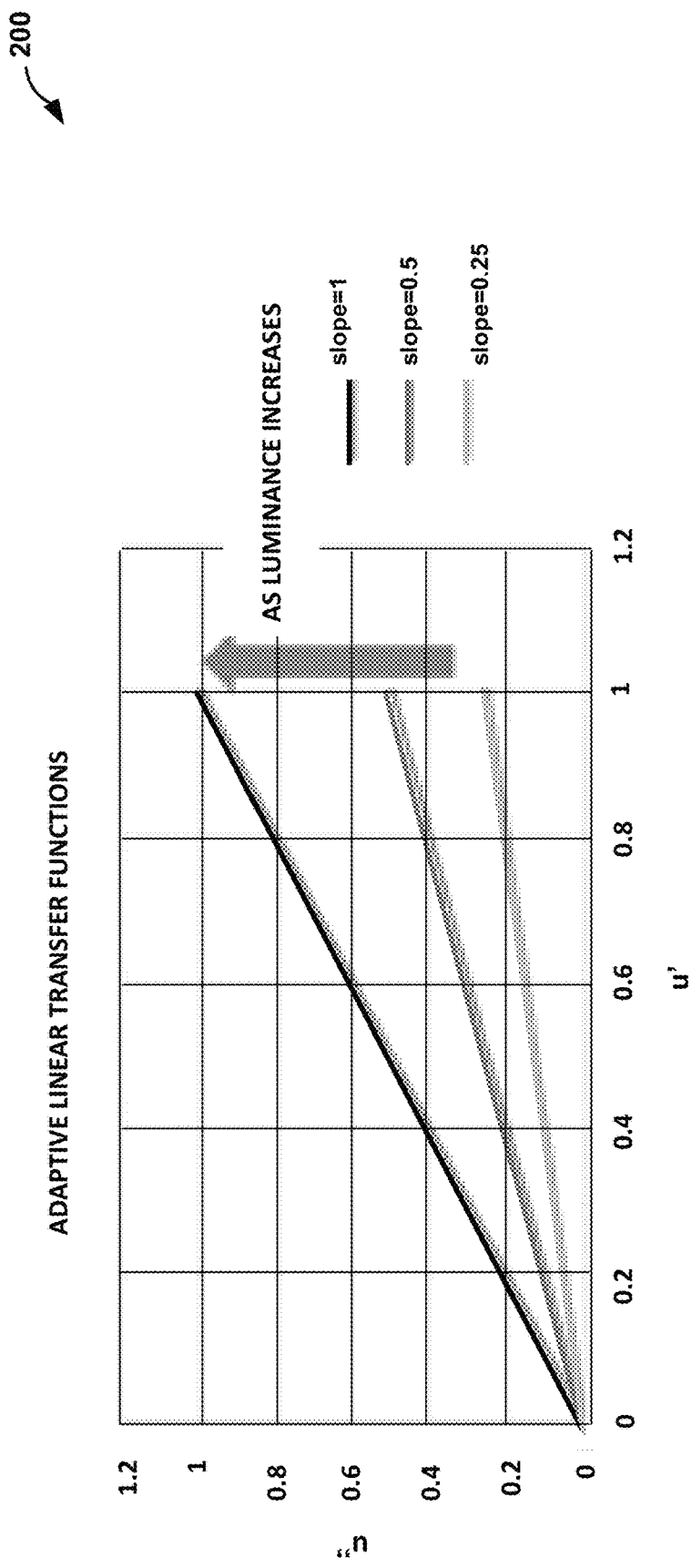
FIG. 4 is a diagram illustrating a graph showing, with respect to luminance, an adaptive slope of a linear transfer function applied in accordance with various aspects of the techniques described in this disclosure.

To illustrate, consider FIG. 4 in which an adaptive slope is shown with respect to luminance. FIG. 4 is a diagram illustrating a graph 200 showing, with respect to luminance, an adaptive slope of a linear TF 110 applied in accordance with various aspects of the techniques described in this disclosure. Compacting unit 104 may determine the slopes to preserve uniform chromaticity perception of the HVS in one or more regions of luminance but suppress uniform chromaticity perception of the HVS in other ranges of luminance. In the example of FIG. 4, where the slope changes from 0.25 to 1.0 as luminance increases, compacting unit 104 may suppress chromaticity information including noises in lower luminance but maintain chromaticity information in higher luminance. Such a design may also allow compacting unit 104 the ability to enhance chromaticity information by adopting a slope larger than 1.0 for a certain luminance range. As such, one example design may determine both when to enhance (suppress) chromaticity information and how much enhancement (suppression) to allow at various luminance ranges. The number of regions, each of which may be associated with a slope and range, may depend on the target application, input characteristics of HDR/WCG video data 17 and various goals of such pre-processing (e.g., SNR, perceived quality, etc.).

Compacting unit 104 may be configured with offsets that are derived to keep similar chromaticity values of grey at each luminance after TF 110 is applied. Compacting unit 104 may, as noted above, determine the offsets based on the type of FCC format used (which may also be referred to as the "FCC coefficients"). In the example of Yu'v' color space, compacting unit 104 may determine the offsets in accordance with the following equations (13) and (14):

$$b_{u'} = 0.19783 * (1 - a_{u'}) \quad (13)$$

$$b_{v'} = 0.46832 * (1 - a_{v'}) \quad (14)$$

In some examples, compacting unit 104 may keep the same slopes and offsets throughout all the input HDR/WCG video data 17. In other examples, compacting unit 104 may adjust the slopes and offsets depending on the input characteristics and FCC coefficients at different levels of granularity, such as slice, picture, and GOP. The effect of adaptive TFs 110 for Yu'v' is visualized in FIGS. 5A-5C.

Figure 5A:
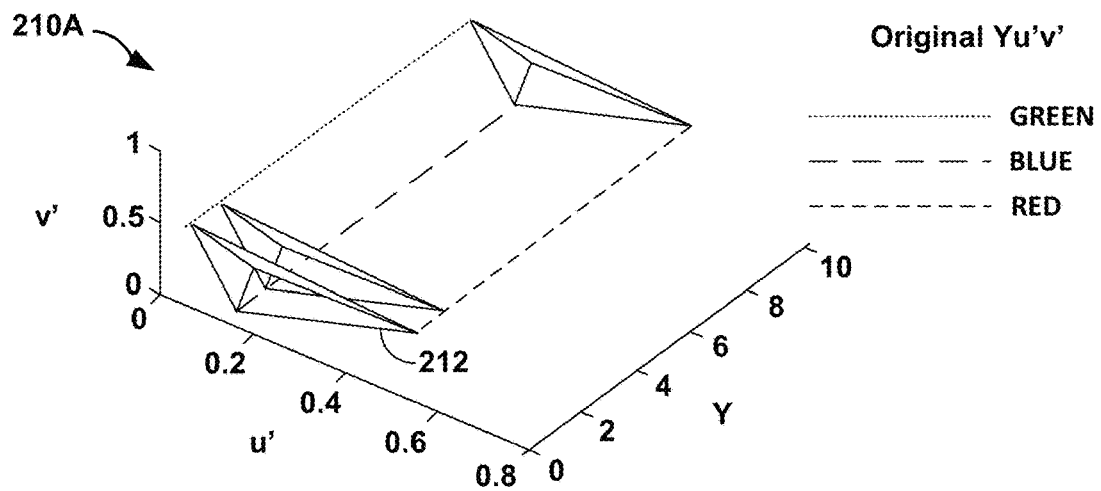
FIGS. 5A-5C are diagrams illustrating graphs showing adaptive transfer functions with offsets relative to adaptive transfer functions without offsets.
Figure 5B:
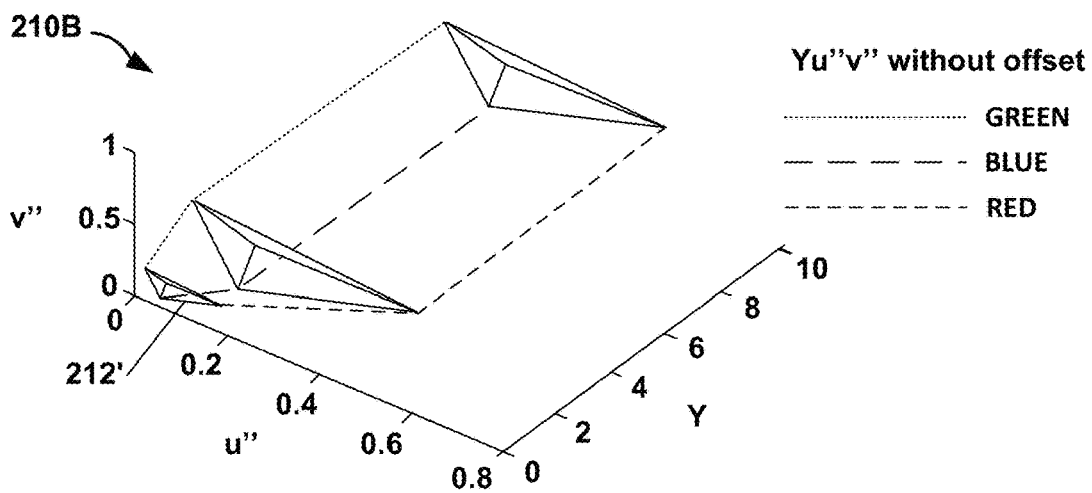
Figure 5C:
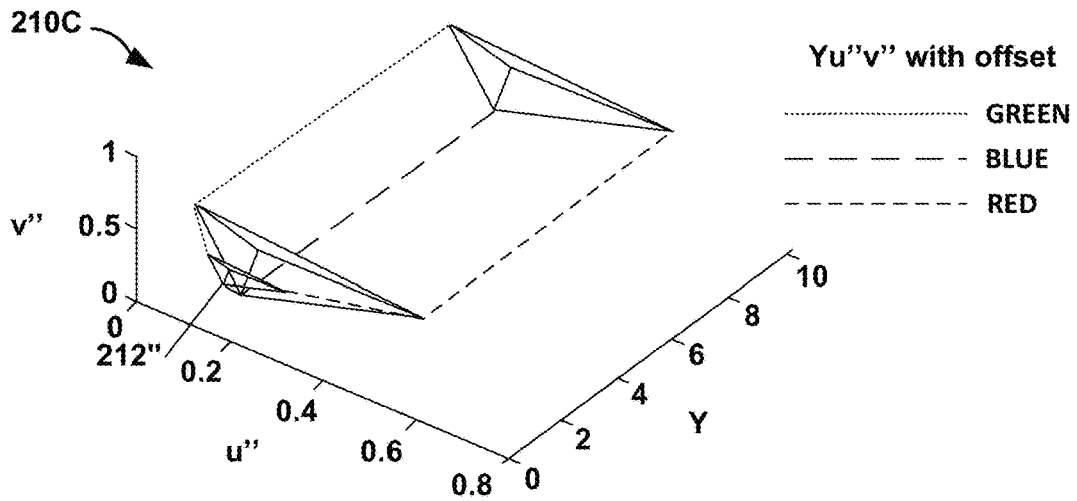

FIGS. 5A-5C are diagrams illustrating graphs 210A-210C showing adaptive TFs 110 with offsets relative to adaptive TFs without offsets. Graphs 210A of FIG. 5A shows the original FCC formatted video data 101 in the form of a trigonal prism containing the BT.2020 color gamut in Yu'v' coordinates with the luminance range of [0, 10]. Triangle 212 represents a sample pixel in low luminance (given that Y for triangle 212 is below 2). Graph 210B of FIG. 5B shows the same triangle 212, which is denoted as 212', after having been compacted using an adaptive linear TF that does not include offsets. Triangle 212' is much smaller than triangle 212 given that triangle 212' has been compacted, where the slope may determine how much the size of the triangle changes with respect to luminance change. Triangle 212, however, has shifted to the left and moved down, indicating that the adaptive linear TF 110 without offsets does not preserve chromaticity, which may lead to visible artifacts. Graph 210C of FIG. 5C shows the same triangle 212', which is denoted as triangle 212", having been offset such that the centroids of triangles at each luminance are correctly aligned in 3D space. Applicant of offsets thereby helps preserve uniform chromaticity.

Regardless of the foregoing aspects of application of TFs 110, compacting unit 104 may derive one or more of TFs 110 and then fix TFs 110 for all types of HDR/WCG video data 17. Alternatively, compacting unit 104 may derive TFs 110 for each type of HDR/WCG video data 17 or for each picture (which may also be referred to as a "frame") of HDR/WCG video data 17.

Compacting unit 104 may apply TFs 110 to adjusted FCC formatted video data 103 to obtain compacted FCC formatted video data 105. Compacting unit 104 may output compacted FCC formatted video data 105 to quantization unit 106.

Quantization unit 106 may represent a unit configured to quantize compacted FCC formatted video data 105 to obtain quantized FCC formatted video data 107. Quantization unit 106 may reduce bit-depths of chromaticity and/or luminance components of the compacted FCC formatted video data 105 to 10 bits, as one example. Quantization unit 106 may output quantized FCC formatted video data 107 to subsampling unit 108.

Subsampling unit 108 may represent a unit configured to subsample quantized FCC formatted video data 107 to obtain pre-processed video data 25. Subsampling unit 108 may subsample quantized FCC formatted video data 107 to reduce the chromaticity components from the 4:4:4 format to the 4:2:0 format. Subsampling unit 108 may output pre-process video data 25 to video encoder 20.

Video pre-processing unit 19 may also generate sideband information 111, which may include information relevant to pre-processing HDR/WCG video data 17 that video post-processing unit 31 may not be able to independently derive and which may be required to perform the reciprocal operations. For example, video pre-processing unit 19 may specify FCC coefficients and associated parameters for the noise reduction and adaptive TFs 110 estimated at the encoder side in sideband information 111.

Video pre-processing unit 19 may provide sideband information 111 to video encoder 20, which may signal sideband information 111 in bitstream 23 as one or more video usability information (VUI) messages, one or more supplemental enhancement information (SEI) messages, and/or one or more SEI update messages. Video encoder 20 may also, in some examples, specify sideband information 111 in a coding tree unit (CTU) header, slice header, and/or picture parameter set (PPS). In some instances, video encoder 20 may utilize sideband information 111 facilitate weighted prediction based processes useful for coding pre-processed video data 25.

Figure 3:
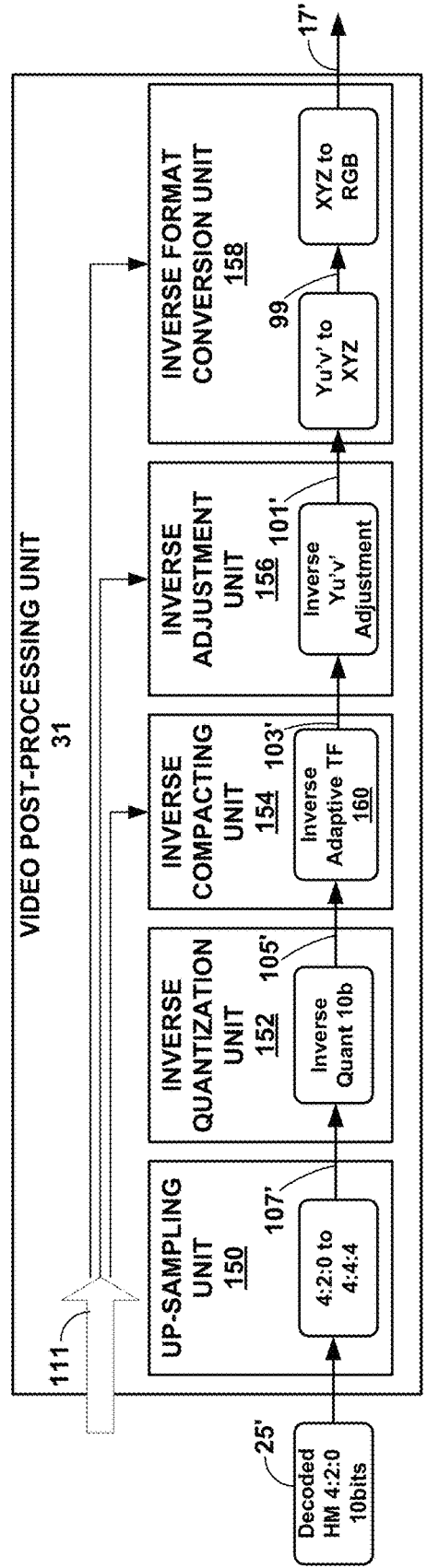
FIG. 3 is a block diagram illustrating the video post-processing unit of FIG. 1 in more detail.

FIG. 3 is a block diagram illustrating video post-processing unit 31 of FIG. 1 in more detail. In the example of FIG. 3, video post-processing unit 31 includes an up-sampling unit 150, an inverse quantization unit 152, an inverse compacting unit 154, an inverse adjustment unit 156, and an inverse format conversion unit 158. Up-sampling unit 150 represents a unit configured to perform operations reciprocal the operations described above with respect to subsampling unit 108 of video pre-processing unit 19. Up-sampling unit 150 may therefore, as one example, up-sample decoded compacted FCC formatted video data 25' to obtain up-sampled compacted FCC formatted video data 107' (which may also be referred to as decoded pre-processed video data 107'). Up-sampling unit 150 may output up-sampled compacted FCC formatted video data 107' to inverse quantization unit 152.

Inverse quantization unit 152 may represent a unit configured to perform operations reciprocal to the operations described above with respect to quantization unit 106 of video pre-processing unit 19. As such, inverse quantization unit 152 may inverse quantize up-sampled compacted FCC formatted video data 107' to obtain dequantized compacted FCC formatted video data 105'. Dequantization may involve expanding the number of bits used to represent each of the luminance and chromaticity components of the up-sampled compacted FCC formatted video data 107'. Inverse quantization unit 152 may output the dequantized compacted FCC formatted video data 105' to inverse compacting unit 154.

Inverse compacting unit 154 may represent a unit configured to perform operations reciprocal to the operations described above with respect to compacting unit 104 of video pre-processing unit 19. As such, inverse compacting unit 154 may apply inverse adaptive TFs 160 (e.g., inverse adaptive linear TFs or inverse log-like TFs) to dequantized compacted FCC formatted video data 105' to obtain decompacted FCC formatted video data 103'. Inverse adaptive TFs 160 may include a perceptual dequantization (PD) optical-electro transfer function (OETF) that is an inverse of the PQ EOTF described above. Inverse compacting unit 154 may determine or otherwise obtain inverse adaptive TF 160 based, as one example, on sidechannel information 111 that is signaled via bitstream 23.

Inverse compacting unit 154 may adaptively apply inverse adaptive TFs 160 to the luminance and chromaticity components of dequantized compacted FCC formatted video data 105' in the various manners described above with respect to compacting unit 104. In other words, inverse compacting unit 154 may, as one example, perform one of applying a same one of inverse adaptive TFs 160 to each of the first and second chromaticity components (i.e., u' and v' in the example of FIG. 3) of dequantized compacted FCC formatted video data 105', or apply a different one of inverse adaptive TFs 160 to each of the first and second chromaticity component of dequantized compacted FCC formatted video data 105'.

As another example, inverse compacting unit 154 may apply an inverse log-like one of inverse adaptive TFs 160 to each of the first and second chromaticity components of dequantized compacted FCC formatted video data 105'. Alternatively, inverse compacting unit 154 may apply an inverse log-like one of inverse adaptive TFs 160 to only a luminance component of the compacted FCC formatted video data and, depending on a level of the decompacted luminance component, apply an inverse adaptive linear one of inverse adaptive TFs 160 to the first and second chromaticity components of dequantized compacted FCC formatted video data 105'.

In this manner, inverse compacting unit 154 may perform the inverse compacting with respect to dequantized compacted FCC formatted video data 105' to obtain decompacted FCC formatted video data 103'. Inverse compacting unit 154 may output decompacted FCC formatted video data 103' to inverse adjustment unit 156.

Inverse adjustment unit 156 may represent a unit configured to perform operations reciprocal to the operations described above with respect to adjustment unit 102 of video pre-processing unit 19. As such, inverse adjustment unit 156 may apply an inverse adjustment to decompacted FCC formatted video data 103' to obtain inverse adjusted FCC formatted video data 101'.

For example, inverse adjustment unit 156 may, when the luminance component of a sample of decompacted FCC formatted video data 103' is lower than a threshold, inverse adjust the corresponding chromaticity component of the sample of decompacted FCC formatted video data 103' by setting the chromaticity component of the sample of decompacted FCC formatted video data 103' to a value signaled in a bitstream 23 (e.g., specified as sidechannel information 111, which may also be referred to as "sideband information 111") associated with decompacted FCC formatted video data 103'. The threshold may be fixed or inverse adjustment unit 156 may derive the threshold based on statistics of HDR and WCG video data 17'.

As another example, inverse adjustment unit 156 may inverse adjust both of the first and second chromaticity components together. Alternatively, inverse adjustment unit 156 may inverse adjust each of the first and second chromaticity components separately.

In this manner, inverse adjustment unit 156 may perform an inverse adjustment with respect to decompacted FCC formatted video data 103' to obtain inverse adjusted FCC formatted video data 101'. Inverse adjustment unit 156 may output inverse adjusted FCC formatted video data 101' to inverse format conversion unit 158.

Inverse format conversion unit 158 may represent a unit configured to perform operations reciprocal to the operations described above with respect to format conversion unit 100 of video pre-processing unit 19. As such, inverse format conversion unit 158 may apply an inverse format conversion with respect to inverse adjusted FCC formatted video data 101' to obtain HDR/WCG video data 17'.

For example, inverse format conversion unit 158 may convert the chromaticity component of inverse adjusted FCC formatted video data 101' to a second color representation format (e.g., from Yu'v' color space to the XYZ color space, which may represent one example of a second color representation format). Inverse format conversion unit 158 may next convert the chromaticity component in the second color representation format to a first color representation format (e.g., from the XYZ color space to the RGB color space, where the RGB color space represents one example of the first color representation format) to obtain HDR/WCG video data 17'. Inverse format conversion unit 158 may determine the color representation formats based on sidechannel information 111 signaled in bitstream 23 associated with inverse adjusted FCC formatted video data 101'.

In this manner, inverse format conversion unit 158 may perform an inverse format conversion with respect to inverse adjusted FCC formatted video data 101' to obtain HDR/WCG video data 17'. Inverse format conversion unit 158 may output HDR/WCG video data 17' as post-processed video data 17' for display via display device 32.

Figure 6:
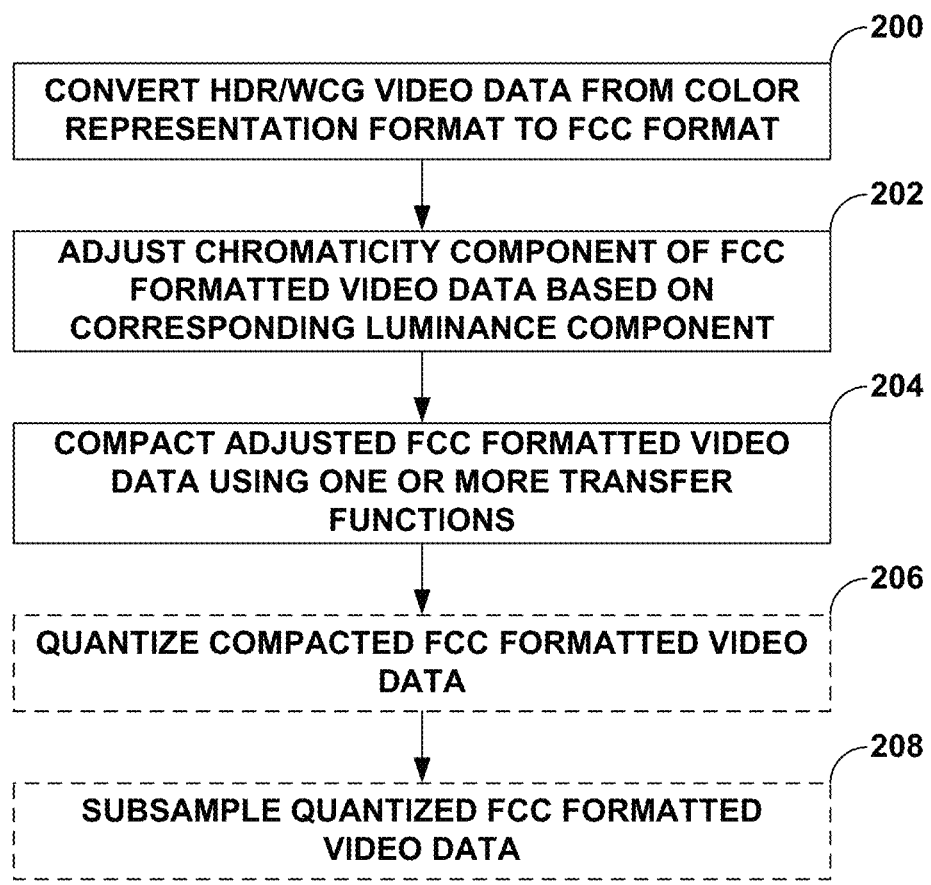
FIG. 6 is a flowchart illustrating example operation of the video pre-processing unit of FIG. 1 in accordance with various aspects of the techniques described in this disclosure.

FIG. 6 is a flowchart illustrating example operation of video pre-processing unit 19 of FIG. 1 in accordance with various aspects of the techniques described in this disclosure. Initially, format conversion unit 100 of video pre-processing unit 19 may receive HDR/WCG video data 17. Format conversion unit 100 may next convert a chromaticity component of HDR/WCG video data 17 from an RGB color space (or other color representation format) to an FCC format, thereby obtaining FCC formatted video data 101 in the manner described above (200).

Chromaticity adjustment unit 102 may next adjust a chromaticity component of the FCC formatted video data 101 based on a corresponding luminance component of FCC formatted video data 101 (202). Chromaticity adjustment unit 102 may adjust the chromaticity components, e.g., u' and v' of FCC formatted video data 101, to suppress noise that occurs during low levels of luminance in any of the number of ways described above. Chromaticity adjustment unit 102 may, through application of the adjustment to FCC formatted video data, obtain adjusted FCC formatted video data 103. Chromaticity adjustment unit 102 outputs the adjusted FCC formatted video data 103 to compacting unit 104.

Compacting unit 104 may compact the adjusted FCC formatted video data 103 using one or more adaptive transfer functions (TFs) 110 in the manner described above (204). Compacting unit 104 may apply TFs 110 to adjusted FCC formatted video data 103 to obtain compacted FCC formatted video data 105. Compacting unit 104 may output compacted FCC formatted video data 105 to quantization unit 106.

Quantization unit 106 may quantize compacted FCC formatted video data 105 to obtain quantized FCC formatted video data 107 (206). Quantization unit 106 may reduce bit-depths of chromaticity and/or luminance components of the compacted FCC formatted video data 105 to 10 bits, as one example. Quantization unit 106 may output quantized FCC formatted video data 107 to subsampling unit 108.

Subsampling unit 108 may represent a unit configured to subsample quantized FCC formatted video data 107 to obtain pre-processed video data 25 (208). Subsampling unit 108 may subsample quantized FCC formatted video data 107 to reduce the chromaticity components from the 4:4:4 format to the 4:2:0 format. Subsampling unit 108 may output pre-process video data 25 to video encoder 20. Both quantization and subsampling may be optional in terms of pre-processing and are denoted as such using dashed lines.

Figure 7:
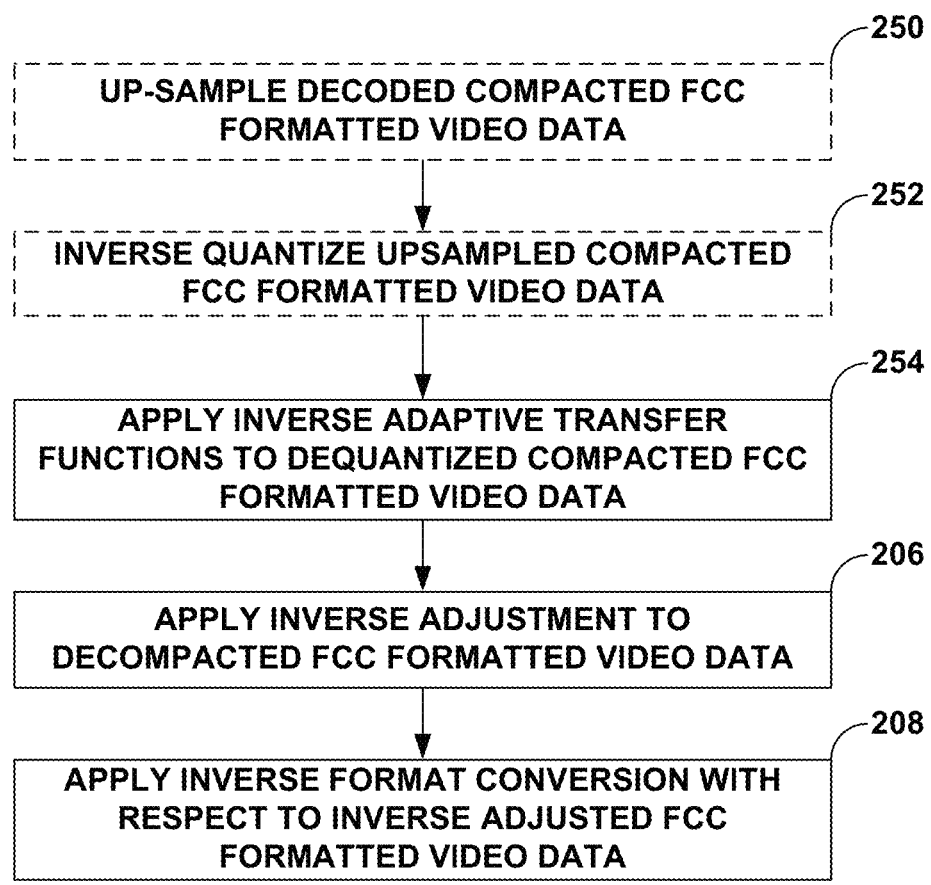
FIG. 7 is a flowchart illustrating example operation of the video post-processing unit of FIG. 3 in performing various aspects of the techniques described in this disclosure.

FIG. 7 is a flowchart illustrating example operation of video post-processing unit 31 of FIG. 3 in performing various aspects of the techniques described in this disclosure. Initially, up-sampling unit 150 may receive decoded compacted FCC formatted video data 25'. Up-sampling unit 150 may up-sample decoded compacted FCC formatted video data 25' to obtain up-sampled compacted FCC formatted video data 107' (which may also be referred to as decoded pre-processed video data 107'') (250). Up-sampling unit 150 may output up-sampled compacted FCC formatted video data 107' to inverse quantization unit 152.

Inverse quantization unit 152 may inverse quantize up-sampled compacted FCC formatted video data 107' to obtain dequantized compacted FCC formatted video data 105' (252). Dequantization may involve expanding the number of bits used to represent each of the luminance and chromaticity components of the up-sampled compacted FCC formatted video data 107'. Inverse quantization unit 152 may output the dequantized compacted FCC formatted video data 105' to inverse compacting unit 154. Both inverse quantization and up-sampling may be optional in terms of post-processing and are denoted as such using dashed lines.

Inverse compacting unit 154 may apply inverse adaptive TFs 160 to dequantized compacted FCC formatted video data 105' to obtain decompacted FCC formatted video data 103' (254). Inverse compacting unit 154 may determine or otherwise obtain inverse adaptive TF 160 based, as one example, on sidechannel information 111 that is signaled via bitstream 23. Inverse compacting unit 154 may output decompacted FCC formatted video data 103' to inverse adjustment unit 156.

Inverse adjustment unit 156 may apply an inverse adjustment to decompacted FCC formatted video data 103' to obtain inverse adjusted FCC formatted video data 101' in the manner described above. Inverse adjustment unit 156 may output inverse adjusted FCC formatted video data 101' to inverse format conversion unit 158.

Inverse format conversion unit 158 may apply an inverse format conversion with respect to inverse adjusted FCC formatted video data 101' to obtain HDR and WCG video data 17' as described in more detail above. Inverse format conversion unit 158 may output HDR and WCG video data 17' as post-processed video data 25' for display via display device 32.

Figure 8:
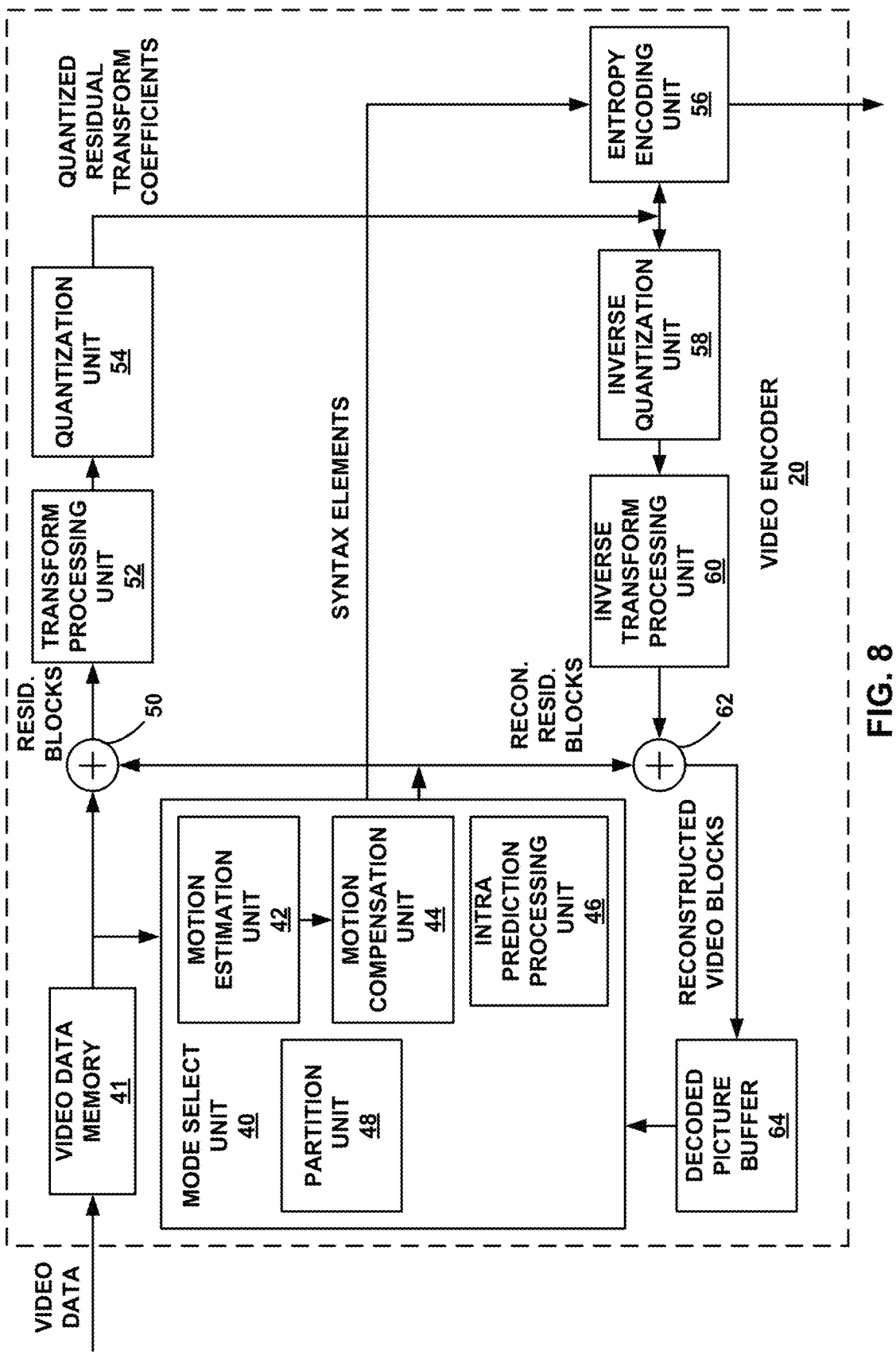
FIG. 8 is a block diagram illustrating an example of a video encoder that may implement techniques of this disclosure to encode pre-processed video data.

FIG. 8 is a block diagram illustrating an example of video encoder 20 that may implement the techniques of this disclosure to encode pre-processed video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 8, video encoder 20 receives a current video block within a video frame to be encoded. The current block having undergone the pre-processing techniques described in this disclosure to enable more efficient video encoding/compression of the current block. In the example of FIG. 8, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra prediction processing unit 46, and partition unit 48. For video block reconstruction, video encoder 20 also includes inverse quantization unit 58, inverse transform processing unit 60, and summer 62. A deblocking filter (not shown in FIG. 11) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Figure 9:
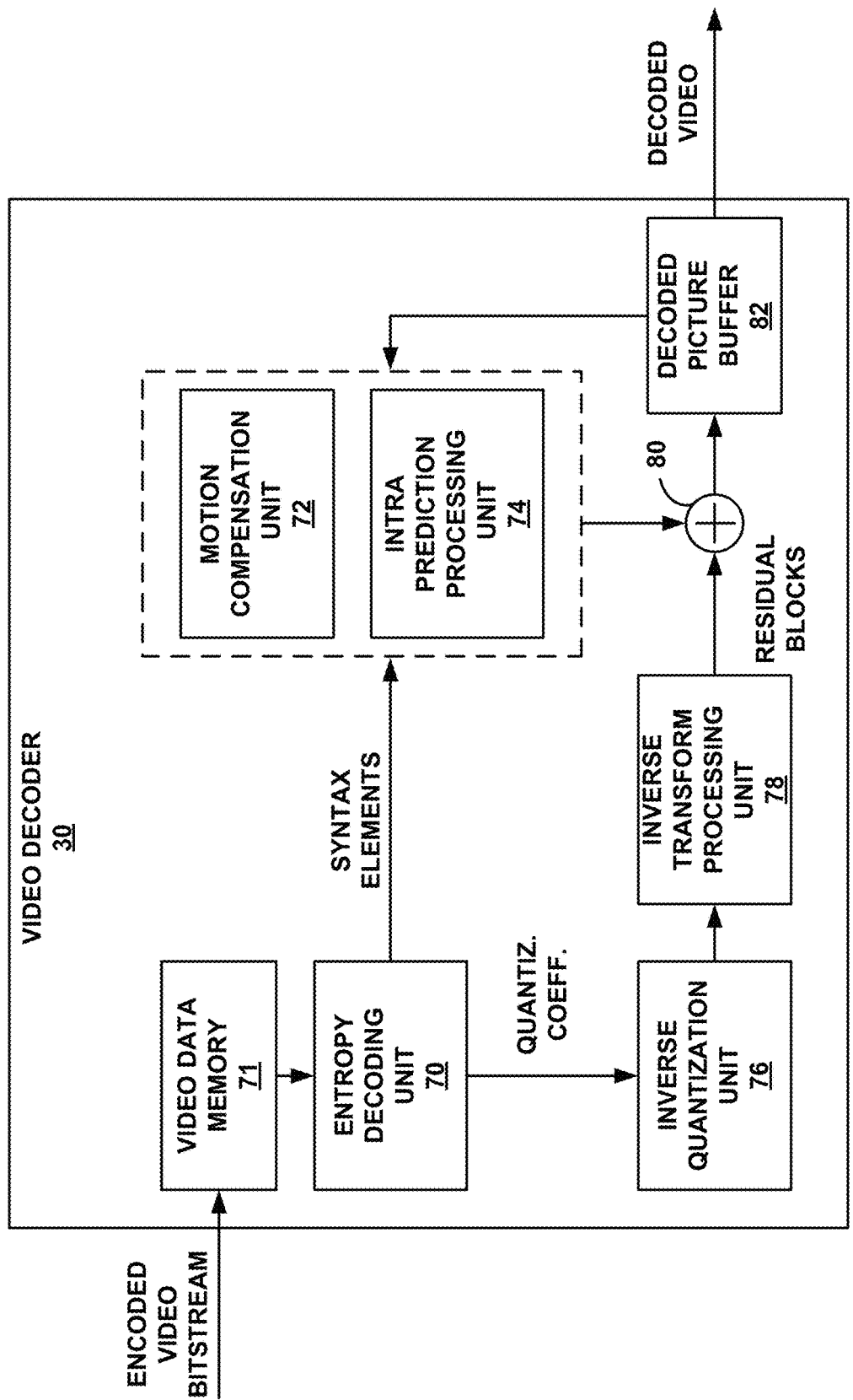
FIG. 9 is a block diagram illustrating an example of a video decoder that may implement techniques of this disclosure to decode video data prior to post-processing the video data.

FIG. 9 is a block diagram illustrating an example of video decoder 30 that may implement the techniques of this disclosure to decode video data prior to post-processing the video data. In the example of FIG. 9, video decoder 30 includes an entropy decoding unit 70, a video data memory 71, motion compensation unit 72, intra prediction processing unit 74, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 9). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality.

The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1. Decoded picture buffer 82 may also output the decoded video block for post-processing in accordance with various aspects of the techniques described in this disclosure.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
applying an inverse log-like transfer function (TF) to only a luminance component of compacted fractional chromaticity coordinate (FCC) formatted video data to obtain a luminance component of decompacted FCC formatted video data;
applying, depending on a level of the luminance component of the decompacted FCC formatted video data, inverse adaptive linear TFs to a chromaticity component of the compacted FFC formatted video data to reverse application of an adaptive linear TF in order to obtain a chromaticity component of decompacted FCC formatted video data;
inverse scaling, based on the luminance component of the decompacted FCC formatted video data, adjusting the chromaticity component of the decompacted FCC formatted video data to obtain inverse adjusted FCC formatted video data; and
converting the chromaticity component of the inverse adjusted FCC formatted video data from the FCC format to a color representation format to obtain High Dynamic Range (HDR) and Wide Color Gamut (WCG) video data.

2. The method of claim 1, wherein the method of processing video data comprises a method of post-processing video data after video decoding the compacted FCC formatted video data, and wherein the method further comprises: up-sampling a chromaticity component of the compacted FCC formatted video data to obtain up-sampled compacted FCC formatted video data; and inverse quantizing the up-sampled compacted FCC formatted video data to obtain the compacted FCC formatted video data.

3. The method of claim 1, wherein the color representation format comprises one of a RGB color space or an XYZ color space, and wherein the compacted FCC formatted video data comprises a Yu'v' color space or an FCC color space adapted based on the HDR and WCG video data.

4. The method of claim 1, wherein inverse scaling the chromaticity component of the decompacted FCC formatted video data comprises, when the luminance component of a sample of the decompacted FCC formatted video data is lower than a threshold, inverse scaling the corresponding chromaticity component of the sample of the decompacted FCC formatted video data by setting the chromaticity component of the sample of the decompacted FCC formatted video data to a value signaled in a bitstream associated with the decompacted FCC formatted video data.

5. The method of claim 4, wherein the threshold is fixed or derived based on statistics of the HDR and WCG video data.

6. The method of claim 1, wherein the chromaticity component of the decompacted FCC formatted video data comprises a first chromaticity component, and wherein the decompacted FCC formatted video data comprises a second chromaticity component, and
wherein inverse scaling the chromaticity component of the decompacted FCC formatted video data comprises one of inverse scaling both of the first and second chromaticity components together or inverse scaling each of the first and second chromaticity components separately.

7. The method of claim 1, wherein the chromaticity component of the compacted FCC formatted video data comprises a first chromaticity component, and wherein the compacted FCC formatted video data comprises a second chromaticity component, and wherein applying, depending on a level of the luminance component of the decompacted FCC formatted video data, inverse adaptive linear TFs to the chromaticity component comprises one of applying a same inverse adaptive linear TF to each of the first and second chromaticity components of the compacted FCC formatted video data, or applying a different inverse adaptive linear TF to each of the first and second chromaticity component of the compacted FCC formatted video data.

8. The method of claim 1, further comprising: converting the chromaticity component of the inverse adjusted FCC formatted video data to a second color representation format; and converting the chromaticity component in the second color representation format to a first color representation format to obtain the HDR and WCG video data.

9. A method of processing video data, the method comprising:
converting a chromaticity component of High Dynamic Range (HDR) and Wide Color Gamut (WCG) video data between a color representation format and fractional chromaticity coordinate (FCC) format to produce a chromaticity component of FCC formatted video data;
scaling the chromaticity component of the FCC formatted video data based on a corresponding luminance component of the FCC formatted video data to obtain adjusted FCC formatted video data; and
applying a log-like transfer function (TF) to only a luminance component of the adjusted FCC formatted video data to obtain a luminance component of compacted FCC formatted video data; and
applying, depending on a level of the luminance component of the compacted FCC formatted video data, adaptive invertible linear TFs to the chromaticity component of the FCC formatted video data to obtain a chromaticity component of the compacted FCC formatted video data.

10. The method of claim 9, further comprising: quantizing the compacted FCC formatted video data to obtain quantized FCC formatted video data; and subsampling the quantized FCC formatted video data to obtain pre-processed video data to be encoded.

11. The method of claim 9, wherein the color representation format comprises one of a RGB color space or an XYZ color space, and wherein the FCC formatted video data comprises a Yu'v' color space or an FCC color space adapted based on the HDR and WCG video data.

12. The method of claim 9, further comprising processing the FCC formatted video data to prevent the FCC formatted video data from exceeding a range.

13. The method of claim 9, wherein scaling the chromaticity component of the FCC formatted video data comprises, when the luminance component of a sample of the FCC formatted video data is lower than a threshold, scaling a corresponding chromaticity component of the sample of FCC formatted video data by, at least in part, performing one of the following: setting the chromaticity component of the FCC formatted video data as values that correspond to black or grey; or setting the chromaticity component of the sample as an average of chromaticity components of neighboring samples within a certain range of the chromaticity component of the sample of the FCC formatted video data.

14. The method of claim 13, wherein the threshold is fixed or derived based on statistics of the HDR and WCG video data.

15. The method of claim 9, wherein the chromaticity component of the FCC formatted video data comprises a first chromaticity component, wherein the FCC formatted video data comprises a second chromaticity component, and wherein scaling the chromaticity component of the FCC formatted video data comprises one of scaling both of the first and second chromaticity components together or adjusting each of the first and second chromaticity components separately.

16. The method of claim 9, wherein the chromaticity component of the FCC formatted video data comprises a first chromaticity component, wherein the FCC formatted video data comprises a second chromaticity component, and wherein applying, depending on a level of the luminance component, adaptive linear TFs to the chromaticity component comprises one of applying a same TF to each of the first and second chromaticity components of the FCC formatted video data, or applying a different TF to each of the first and second chromaticity component of the FCC formatted video data.

17. The method of claim 9, wherein the method of processing video data comprises a method of pre-processing video data for video encoding, the method further comprising: estimating the FCC formatted video data and associated parameters for the chromaticity component adjustment and the adaptive TFs at a video encoder; and signaling the FCC formatted video data and associated parameters from the video encoder to a video decoder in an encoded bitstream.

18. The method of claim 9, wherein the method of processing video data comprises a method of pre-processing video data for video encoding, the method comprising: converting the chromaticity component of the HDR and WCG video data from a first color representation format to a second color representation format; converting the chromaticity component in the second color representation format to the FCC formatted video data; quantizing the compacted FCC formatted video data to produce quantized FCC formatted video data; and down-sampling the quantized FCC formatted video data to obtain pre-processed video data to be video encoded.

19. A device configured to process video data, the device comprising:
a memory configured to store compacted fractional chromaticity coordinate (FCC) formatted video data; and a processor configured to:
apply an inverse log-like transfer function (TF) to only a luminance component of the compacted FCC formatted video data to obtain a luminance component of decompacted FCC formatted video data;
apply, depending on a level of the luminance component of the decompacted FCC formatted video data, an inverse adaptive linear TFs to a chromaticity component of the compacted FFC formatted video data to reverse application of an adaptive linear TF in order to obtain a chromaticity component of decompacted FCC formatted video data;
inverse scaling the chromaticity component of the decompacted FCC formatted video data based on the luminance component of the decompacted FCC formatted video data to obtain inverse adjusted FCC formatted video data; and
convert the chromaticity component of the inverse adjusted FCC formatted video data from the FCC format to a color representation format to obtain High Dynamic Range (HDR) and Wide Color Gamut (WCG) video data.

20. The device of claim 19, further comprising a video decoder configured to video decode a bitstream to obtain the compacted FCC formatted video data, wherein the processor is further configured to: up-sample a chromaticity component of the compacted FCC formatted video data to obtain up-sampled compacted FCC formatted video data; and inverse quantize the up-sampled compacted FCC formatted video data to obtain the compacted FCC formatted video data.

21. The device of claim 19, wherein the color representation format comprises one of a RGB color space or an XYZ color space, and wherein the compacted FCC formatted video data comprises a Yu'v' color space or an FCC color space adapted based on the HDR and WCG video data.

22. The device of claim 19, wherein the processor is configured to, when the luminance component of a sample of the decompacted FCC formatted video data is lower than a threshold, scale the corresponding chromaticity component of the sample of the decompacted FCC formatted video data by setting the chromaticity component of the sample of the decompacted FCC formatted video data to a value signaled in a bitstream associated with the decompacted FCC formatted video data.

23. The device of claim 22, wherein the threshold is fixed or derived based on statistics of the HDR and WCG video data.

24. device configured to process video data, the device comprising:
a memory configured to store High Dynamic Range (HDR) and Wide Color Gamut (WCG) video data; and
a processor configured to: convert a chromaticity component of HDR and WCG video data between a color representation format and fractional chromaticity coordinate (FCC) format;
scale a chromaticity component of the FCC formatted video data based on a corresponding luminance component of the FCC formatted video data to obtain adjusted FCC formatted video data; and
apply a log-like transfer function (TF) to only a luminance component of the adjusted FCC formatted video data to obtain a luminance component of compacted FCC formatted video data; and
apply, depending on a level of the luminance component of the compacted FCC formatted video data, adaptive invertible linear TFs to the chromaticity component of the FCC formatted video data to obtain a chromaticity component of the compacted FCC formatted video data.

25. The device of claim 24, wherein the processor is further configured to: quantize the compacted FCC formatted video data to obtain quantized FCC formatted video data; and subsample the quantized FCC formatted video data to obtain pre-processed video data to be encoded.

26. The device of claim 24, further comprising a video encoder configured to: estimate the compacted FCC formatted video data and associated parameters for the adjustment and the adaptive TFs; and signal the compacted FCC formatted video data and the associated parameters from the video encoder to a video decoder in an encoded bitstream.

27. The device of claim 24, wherein the processor is further configured to: convert the chromaticity component of the HDR and WCG video data from a first color representation format to a second color representation format; convert the chromaticity component in the second color representation format to the FCC formatted video data; quantize the compacted FCC formatted video data to produce quantized FCC formatted video data; and down-sample the quantized FCC formatted video data to obtain pre-processed video data to be video encoded.

28. The method of claim 1, wherein applying the inverse adaptive linear TFs comprises: obtaining, depending on a level of the luminance component of the decompacted FCC formatted video data, a chroma scale; and applying the chroma scale to the chromaticity component of the compacted FCC formatted video data to obtain the chromaticity component of the decompacted FCC formatted video data.

29. The method of claim 9, wherein scaling the chromaticity component of the FCC formatted video data comprises: obtaining, depending on a level of the luminance component of the FCC formatted video data, a chroma scale; and applying the chroma scale to the chromaticity component of the FCC formatted video data to obtain the adjusted FCC formatted video data.

* * * * *